June 24, 1924.
V. N. ROMANO
COMPOSITE THRUST BEARING
Filed Aug. 9, 1922    2 Sheets-Sheet 1
1,498,578
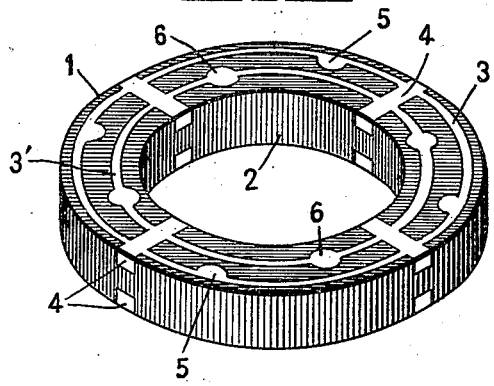
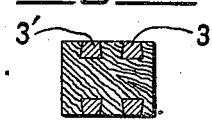
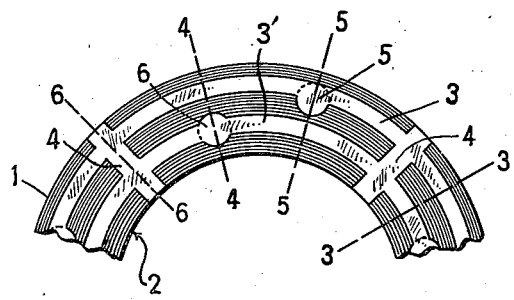
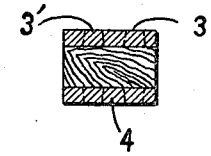
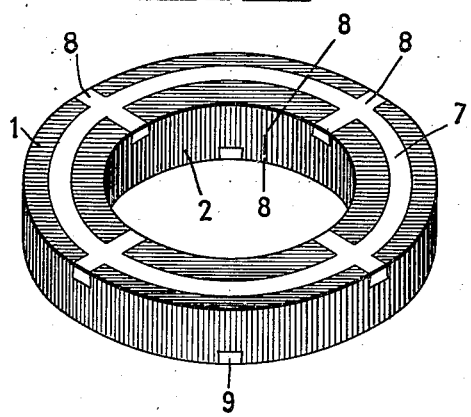
INVENTOR
*Vittorio Nicola Romano*
BY
ATTORNEY

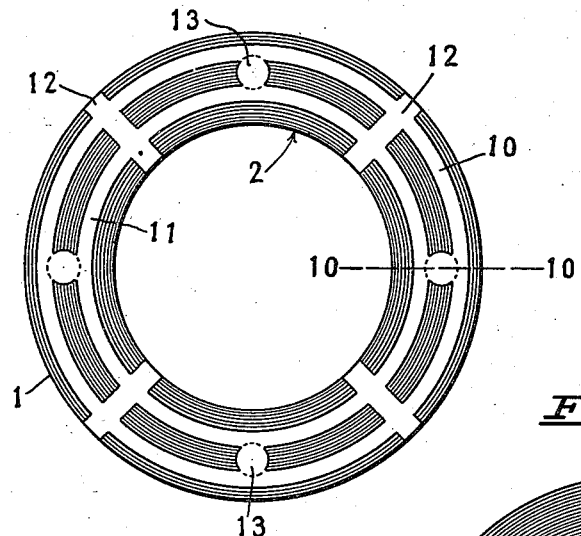
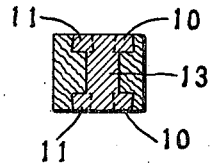
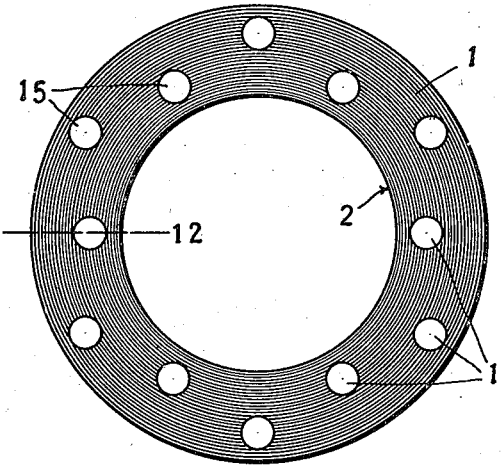
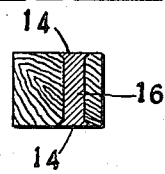
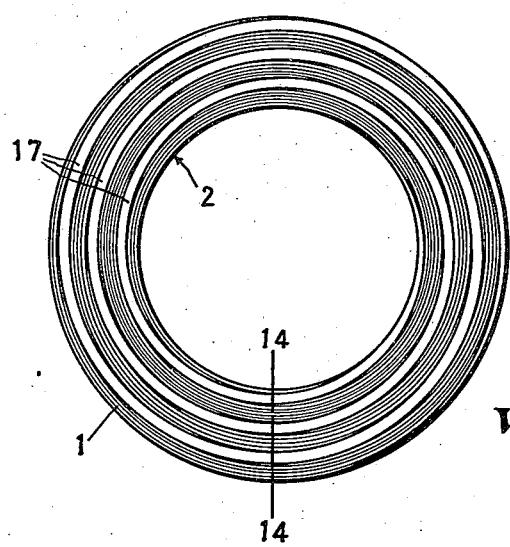
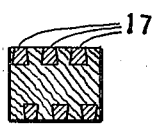

Patented June 24, 1924.

1,498,578

UNITED STATES PATENT OFFICE.

VITTORIO NICOLA ROMANO, OF MIDDLESEX BOROUGH, NEW JERSEY.

COMPOSITE THRUST BEARING.

Application filed August 9, 1922. Serial No. 580,642.

*To all whom it may concern:*

Be it known that I, VITTORIO NICOLA ROMANO, a citizen of the United States, and a resident of the borough of Middlesex, in the county of Middlesex and State of New Jersey, have invented certain new and useful Improvements in Composite Thrust Bearings, of which the following is a full, clear, and exact description, whereby anyone skilled in the art may make and use the same.

The invention relates to bearings, and as indicated by its title, to thrust bearings. More specifically, it is a thrust bearing or plate of composite type involving a main body susceptible of impregnation with a lubricant and with inserts of a different character for aiding in sustaining loads imposed upon the bearing.

The object of the invention is to provide a self lubricating element into the face or faces of which are locked metallic elements.

A further object is to interlock metallic elements at opposite sides of a plate of material, which material is susceptible of impregnation with a lubricant. It is a still further object to interlock metallic elements with the main body of the plate so as to insure stability and noncreeping and loosening of the various elements. Referring to the drawings:

Figure 1, is a perspective view of a form of thrust plate embodying the invention.

Figure 2, is a fragmentary section of the plate in plan view.

Figure 3, is a cross sectional view on the line 3—3 of Figure 2.

Figure 4 is a cross sectional view on the line 4—4 of Figure 2.

Figure 5, is a cross sectional view on the line 5—5 of Figure 2.

Figure 6, is a cross sectional view on the line 6—6 of Figure 2.

Figure 7, is a perspective view illustrating a method of interlocking a ring of metal in a self lubricating body part.

Figure 8, is a sectional view on the line 8—8 of Figure 7.

Figure 9, illustrates a plurality of rings cross bound and interlocked through the plate.

Figure 10, is a cross sectional view on the line 10—10 of Figure 9.

Figure 11, illustrates the interlocking of heads and studs through the plate.

Figure 12, is a cross sectional view on the line 12—12 of Figure 11.

Figure 13, illustrates a spiral form of rings in the face of the body.

Figure 14, is a cross section on the line 14—14 of Figure 13.

Thrust plates or bearings formed from bronze or other metallic body and with lubricating grooves therein have heretofore been used with a certain degree of success and bronze discs or plates having grooves in one or both faces filled with a pasted in graphite or similar lubricant have been employed.

Such thrust bearings have all had the fault of lack of unity between the elements. As a result, graphite or other lubricant pasted into the grooves or recesses has become dislodged and the bearings thus become unfit for use. Furthermore, the use of a bronze or other metallic body provides a plate of unnecessary weight and it is only lubricated by the materials pasted into the face grooves thereof.

It is one of the principal objects of the present invention to overcome these objections by providing a self lubricating thrust bearing in which the body or main plate or disc is first formed of a material such as wood, fibre or the like, that is susceptible of impregnation with a lubricant.

Plates formed from such material are then grooved on one or both faces and so bored, from face to face, that the material poured, cast or pressed into the grooves is securely locked through the plate.

Various arrangements of grooves and interlocking elements may be employed so that every elemental line of the material and the grooves will be traversed by a film of lubricant picked up from the body part of the plate.

Figures 1 to 6, inclusive, illustrate such a bearing in which the body part 1, is of ring form having a shaft opening 2.

On opposite faces of this body part, 1, a plurality of grooves 3, 3', are formed while cross channels of radial arrangement 4, connect the grooves.

As illustrated, perforations 5, are formed through the body part and extend as to their periphery within the inner circumference of a groove 3. Similar perforations 6, are arranged concentric with the grooves 3 These perforations 5, 6, extend completely through the plate or body part 1, and intersect similar grooves on the opposite side of said body part.

When the body part 1, has been thus grooved and bored, a metal such as babbitt or other bearing metal is cast into the grooves 3, 3', 4 and the perforations 5. This is readily effected by holding the body 1, between the casting plates or guides and pouring the metal until it completely fills all the grooves and perforations.

As a resulting product, there is the self lubricating body 1, having in its opposite faces a plurality of concentric grooves and cross bars all bound together through the plate by the metal filling the perforations. Of course, the surfaces are finished to exact dimensions.

In Figure 7, there is illustrated a single groove of comparatively wide face as at 7, having cross grooves 8, to prevent tilting or movement of the filled in material. These grooves, as illustrated, are undercut so that the base of the groove as at 9. both as to the element 7, and 8, is considerably wider than the bearing face. In this manner, the cast in metal is securely locked to the body 1.

In Figure 9, the concentric rings 10, and 11, are cross tied by the bars 12, and intermediate these cross bars cylindrical borings 13, connect with both the grooves 10, and 11.

There is thus a bonding of the metal in the concentric grooves, both by the metal of the radially disposed bars 12, and the metal filling the perforations 13.

The grooves and bars are formed on opposite sides of the body 1, and the perforations lock the metal elements through the plate in the body. In Figures 11, and 12, in place of indented grooves, a staggered arrangement of perforations is provided, which perforations are counter bored as at 14, on opposite sides of the plate, thus providing for comparatively large heads of metal 15, on opposite sides of the plate which are interconnected through the plate by the cast in studs 16.

It will be observed, that in any of the arrangements described, a main thrust is taken up by the metallic parts which are cross connected by the studs cast into the perforations thus relieving much of the strain upon the body part or lubricating element. In other words, the direct thrust is taken up on solid metal which is cushioned into the lubricating body. The body is sufficiently strong to withstand strain so evenly dispersed throughout by the arrangement of the metallic parts.

In Figure 13, in place of having concentric grooves filled with metal, a spiral groove 17, is formed which. as illustrated in the cross sectional view, Figure 14, is undercut to thoroughly interlock with the lubricating body 1. The spiral grooves are formed in the opposed faces of the body.

It will be quite obvious that various modifications and arrangements of grooves interconnected through the body may be employed to receive the metal elements of the bearing.

Perhaps a most important necessity is that the main body be a lubricating body capable of supporting the metal elements in its faces.

The next most important feature is that the metallic elements are bonded through and through the body part so that there is, in effect, a metallic sustaining element in both faces of the body which elements are joined by studs to receive the higher stress imposed upon the thrust bearing.

The metallic element with the body part entirely removed would resemble a cage of metal having parallelly disposed rings interconnected by studs. When this formation is provided by casting directly into the grooves and perforations of the lubricating body part 1, a bearing of almost homogeneous character results.

There is little opportunity of the babbitt or similar metal becoming overheated and "running" as is the case in most babbitted bearings whenever there is a failure of lubrication.

In the bearing herein described, the lubricant is always present and the moment the bearing tends to "warm up," sufficient lubricant will exude from the body part to cover every elemental line of the metal. As this occurs, the coefficient of friction immediately drops and there is no further heating, at any rate, to a point which will permit the metal to run.

The bearing is essentially self lubricating, requiring no oiling other than that which is supplied by the inherent character of the main body part.

The presence of oil will have no deleterious effect upon this bearing. This is not true of bronze and graphite bearings where the presence of oils causes deterioration of the graphite. It will. therefore, be apparent that the bearing hereinabove described, while essentially a self lubricating bearing, may be used in the presence of oil and upon failure of the usual oil supply will continue to lubricate.

What I claim as my invention and desire to secure by Letters Patent is:

1. A bearing consisting of a body part impregnated with a lubricant and having a substantially flat bearing face, said body part possessing self lubricating characteristics, grooves in the bearing face of said body part and a bearing metal filling said grooves.

2. A bearing consisting of a body part impregnated with a lubricant and having self lubricating characteristics, grooves in the opposite surface thereof, and a bearing metal filling said grooves.

3. A bearing consisting of a body part impregnated with a lubricant and having self lubricating characteristics, grooves in the opposite surface thereof, perforations extending from one surface to the other and intersecting the grooves and a bearing metal filling the grooves and perforations.

4. A composite bearing consisting of a disc or plate impregnated with a lubricant and having a central opening, a plurality of grooves formed in the opposite faces of said plate, said grooves being interconnected by perforations extending through the plate and a bearing metal filling said grooves and perforations.

5. A composite thrust bearing comprising a plate or disc of self lubricating material having a plurality of concentric grooves in opposite faces thereof, a plurality of radial grooves extending across the faces of the plate and interconnecting the concentric grooves and a bearing metal filling the concentric and radial grooves.

6. A composite bearing comprising a plate or disc having a plurality of concentric grooves in opposite faces thereof, radial grooves interconnecting the concentric grooves, perforations interconnecting the grooves on opposite sides of the plate and a bearing metal filling the various grooves and perforations.

7. A composite thrust bearing comprising a plate or disc of fibrous material impregnated with a lubricant, perforations extending through said plate, countersunk recesses on each end of the perforations and a bearing metal filling said perforations.

8. A composite thrust bearing comprising a plate or disc of fibrous material, impregnated with a lubricant, undercut grooves formed in opposite faces of said plate and a bearing metal filling said grooves.

9. A composite thrust bearing comprising a plate or disc of fibrous material impregnated with a lubricant, undercut grooves formed in opposite faces of said plate, perforations extending through the plate and interconnecting the grooves and a bearing metal filling said grooves and perforations.

10. In a composite thrust bearing, a disc or plate of fibrous material impregnated with a lubricant, an eccentric groove in the face of said plate and a bearing metal filling said groove.

11. In a composite thrust bearing, a disc or plate of fibrous material impregnated with a lubricant, eccentric grooves in the opposite faces of the plate and a bearing metal filling said grooves.

VITTORIO NICOLA ROMANO.

Witnesses:
GEORGE W. HARRIS,
JAMES CURCIO.